3,056,778
20-HYDROXYMETHYL-PREGNANES AND
PROCESS FOR PRODUCING SAME
Daniel Bertin, Montrouge, and Lucien Nedelec, Clichy-sous-Bois, France, assignors to Roussel-UCLAF, Paris, France, a corporation of France
No Drawing. Filed Jan. 23, 1962, Ser. No. 168,238
Claims priority, application France Jan. 24, 1961
9 Claims. (Cl. 260—239.55)

The invention relates to a novel process for the preparation of 20-hydroxymethyl-pregnanes having the formula

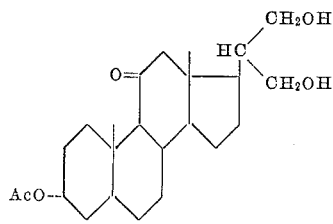

I wherein Ac is the acyl radical of an aliphatic acid having 2 to 7 carbon atoms. The invention also relates to novel intermediates for the preparation of compounds of Formula I.

The 20-hydroxymethyl-pregnanes of Formula I possess a coronary dilatatory activity as more fully described in the copending, commonly assigned United States patent application Serial No. 116,976, filed June 14, 1961.

It is an object of the invention to provide a novel process for the preparation of 20-hydroxymethyl-pregnanes of Formula I.

It is another object of the invention to provide novel intermediates for the preparation of 20-hydroxymethyl-pregnanes of Formula I:

20-hydroxymethyl-5β-pregnane-3α,11β,21-triol,
The acetonide of 20-hydroxymethyl-5β-pregnane-3α,11β,21-triol,
The acetonide of 3α-acetoxy-20-hydroxymethyl-5β-pregnane-11β,21-diol,
The acetonide of 3α-acetoxy-20-hydroxymethyl-5β-pregnane-21-ol-11-one.

These and other objects and advantages of the invention will become obvious from the following detailed description.

The process of the invention comprises reducing the di-lower alkyl ester of 20-carboxy-5β-pregnane-3α-ol-11-one-21-oic acid with a mixed hydride such as lithium aluminium hydride to form 20-hydroxymethyl-5β-pregnane-3α,11β,21-triol, reacting the latter with a lower aliphatic ketone to form the corresponding ketonide of 20-hydroxymethyl-5β-pregnane-3α,11β,21-triol, esterifying the latter with an esterifying agent to form a lower aliphatic ketonide of 3α-acyloxy-20-hydroxymethyl-5β-pregnane-11β,21-diol wherein the acyl radical is derived from an aliphatic carboxylic acid having 2 to 7 carbon atoms, oxidizing the latter with a sulfochromic oxidizing agent to form a lower aliphatic ketonide of 3α-acyloxy-20-hydroxymethyl-5β-pregnane-21-ol-11-one where acyl has the above meaning, hydrolyzing the latter under acidic conditions to form 3α-acyloxy-20-hydroxymethyl-5β-pregnane-21-ol-11-one where acyl has the above meaning and recovering the latter.

A preferred mode of the process of the invention comprises reducing the di-lower alkyl ester of 20-carboxy-5β-pregnane-3α-ol-11-one-21-oic acid in an inert solvent such as tetrahydrofuran with lithium aluminium hydride to form 20-hydroxymethyl-5β-pregnane-3α,11β,21-triol, reacting the latter with acetone in the presence of perchloric acid to block the alcohol function on the hydroxymethyl group on the 20 carbon atom and the hydroxy group on the 21 carbon atom and form the acetonide of 20-hydroxymethyl-5β-pregnane-3α,11β,21-triol, esterifying the latter with the desired acid anhydride of an aliphatic carboxylic acid having 2 to 7 carbon atoms, preferably acetic anhydride, in the presence of pyridine to form the acetonide of 3α-acyloxy-20-hydroxymethyl-5β-pregnane-11β,21-diol wherein the acyl radical is derived from an aliphatic carboxylic acid having 2 to 7 carbon atoms, oxidizing the latter with chromic acid in the presence of acetone and sulfuric acid to form the acetonide of 3α-acyloxy-20-hydroxymethyl-5β-pregnane-21-ol-11-one, hydrolyzing the latter in ethanol in the presence of hydrochloric acid to form 3α-acyloxy-20-hydroxymethyl-5β-pregnane-21-ol-11-one and recovering the latter. The reaction scheme is illustrated in Table I.

TABLE I

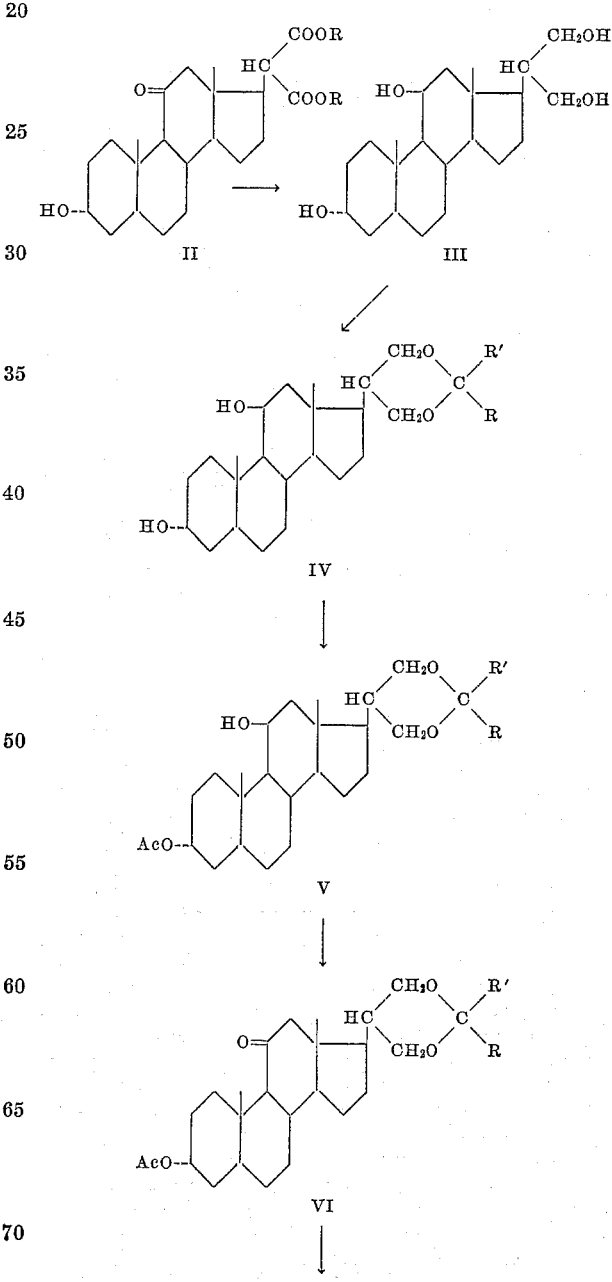

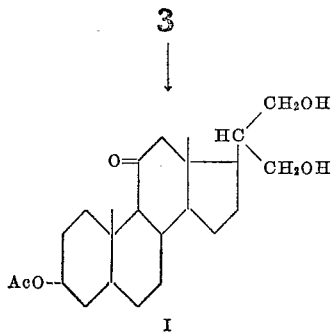

wherein Ac has the above definition and R and R' are lower alkyl radicals.

While the preferred acid ester is the acetic acid ester, other aliphatic carboxylic acids having 2 to 7 carbon atoms may be used. Examples of suitable acids are trimethyl acetic acid, propionic acid, 4,4-dimethyl pentanoic acid, acrylic acid, crotonic acid, methacrylic acid, etc.

In the following examples there are described several preferred embodiments to illustrate the invention. However, it should be understood that the invention is not intended to be limited to the specific embodiments.

EXAMPLE

*Preparation of 3α-Acetoxy-20-Hydroxymethyl-5β-Pregnane-21-Ol-11-One (I)*

STEP A.—PREPARATION OF 20-HYDROXYMETHYL-5β-PREGNANE-3α,11β,21-TRIOL (III)

420 mg. of the dimethyl ester of 20-carboxy-5β-pregnane-3α-ol-11-one-21-oic acid (II) in a solution of 25 cc. of tetrahydrofuran were added to a suspension of 400 mg. of lithium aluminum hydride in 15 cc. of tetrahydrofuran. The mixture was agitated for a period of 6 hours. The mixture was then cooled to 0° C. and the excess of hydride was destroyed by the slow addition of 5 cc. of ethyl acetate at a temperature below +15° C. Then salt water was introduced until the formation of a white paste of aluminum hydroxide. The organic solution was decanted and the solid residue was washed with ethyl acetate. The ethyl acetate of the wash solution was added to the organic solution and the organic layers were washed with salt water, dried over sodium sulfate and evaporated to dryness under vacuum.

The dry residue was taken up in 0.4 cc. of methanol. Then the solution was diluted by the addition of 2 cc. of methylene chloride. Crystallization commenced and the solution was cooled to 0° C. The crystals obtained were vacuum filtered, washed with methylene chloride and dried. 258 mg. of 20-hydroxymethyl-5β-pregnane-3α,11β,21-triol (III) were obtained having a melting point of 175–176° C. and 190–192° C.

The product was soluble in alcohol and ethyl acetate, slightly soluble or insoluble in water and chloroform, insoluble in ether.

*Analysis.*—$C_{22}H_{38}O_4$; molecular weight=366.52. Calculated: C, 72.09%; H, 10.45%. Found: C, 72.4%; H, 10.3%.

This compound is not described in the literature.

The dimethyl ester of 20-carboxy-5β-pregnane-3α-ol-11-one-21-oic acid was prepared from 3α-acyloxy-5β-androstane-11,17-dione wherein the acyl group is derived from an aliphatic carboxylic acid having 2 to 7 carbon atoms by reaction with ethyl cyanoacetate to form the ethyl ester of 3α-acyloxy-20-cyano-$\Delta^{17(20)}$-5β-pregnene-11-one-21-oic acid, hydrogenation of the latter to form the ethyl ester of 3α-acyloxy-20-cyano-5β-pregnane-11-one-21-oic acid, simultaneous saponification and hydrolysis of the latter under alkaline conditions to form 20-carboxy-5β-pregnane-3α-ol-11-one-21-oic acid and esterifying the latter with methanol to form the dimethyl ester of 20-carboxy-5β-pregnane-3α-ol-11-one-21-oic acid as more fully described in applicants' copending, commonly assigned United States patent application Serial No. 172,039, filed on even date herewith.

STEP B.—PREPARATION OF THE ACETONIDE OF 20-HYDROXYMETHYL - 5β - PREGNANE - 3α,11β,21 - TRIOL (IV)

1.47 g. of 20-hydroxymethyl-5β-pregnane-3α,11β,21-triol (III) were placed in suspension in 70 cc. of acetone. Then under agitation 0.20 cc. of 65% perchloric acid solution was added. The solution was allowed to remain under nitrogen for a period of about 2 hours and then was neutralized by the addition of sodium carbonate. The solution was filtered and concentrated to about 20 cc. under vacuum in the presence of pyridine.

Water was added to the solution and the mixture was agitated and the precipitate vacuum filtered. The precipitate was washed with water, dried, then triturated with isopropyl ether. 1.23 g. of the acetonide of 20-hydroxymethyl-5β-pregnane-3α,11β,21-triol (IV) were obtained having a melting point of 175–177° C., which was used as such for the following step.

This compound is not described in the literature.

STEP C.—PREPARATION OF THE ACETONIDE OF 3α-ACETOXY - 20 - HYDROXYMETHYL - 5β - PREGNANE-11β,21-DIOL (V)

1.15 g. of the acetonide of 20-hydroxymethyl-5β-pregnane-3α,11β,21-triol (IV) were dissolved in a mixture of 5 cc. of pyridine and 2.5 cc. of acetic anhydride, and the mixture was allowed to stand under nitrogen for a period of about 3 hours. The reaction mixture was poured on ice, agitated, then vacuum filtered. The precipitate was washed and triturated finally with isopropyl ether. 1.045 g. of the acetonide of 3α-acetoxy-20-hydroxymethyl-5β-pregnane-11β,21-diol (V) were obtained which was purified with aqueous acetone in the presence of pyridine. The purified product had a melting point of 186–187° C.

The product was soluble in acetone, benzene and chloroform, slightly soluble in alcohol, insoluble in water. Dilute aqueous acids decomposed it.

*Analysis.*—$C_{27}H_{44}O_5$; molecular weight=448.62. Calculated: C, 72.28%; H, 9.89%; C, 17.83%. Found: C, 72.6%; H, 9.9%; C, 17.9%.

This compound is not described in the literature.

STEP D.—PREPARATION OF THE ACETONIDE OF 3α-ACETOXY - 20 - HYDROXYMETHYL - 5β - PREGNANE-21-OL-11-ONE (VI)

0.450 g. of the acetonide of 3α-acetoxy-20-hydroxymethyl-5β-pregnane-11β,21-diol (V) was dissolved in 95 cc. of acetone. The solution was cooled to between 0° and +5° C. and slowly 0.29 cc. of the oxidizing solution was added. The oxidizing solution was prepared starting from:

| | |
|---|---|
| Chromic acid | g 13.36 |
| Concentrated sulfuric acid | cc 11.5 |
| Water (sufficient to make) | cc 50 |

The reaction mixture was heated for a period of a half hour at between 0° and +5° C. Then 0.95 cc. of methanol and 0.95 g. of sodium carbonate were added and the mixture was agitated for a half hour. The mineral salts were filtered off and washed with acetone. The wash liquors were combined with the mother liquors and concentrated to a small volume in the presence of a small amount of pyridine.

The concentrated acetonic solution was added to water. This provoked a crystallization of the desired product. The precipitate was vacuum filtered, washed with water, then triturated with aqueous acetone. 0.473 g. of the acetonide of 3α-acetoxy-20-hydroxymethyl-5β-pregnane-21-ol-11-one (VI) was obtained which was purified by trituration with isopropyl ether. This gave 0.400 g. of pure product having a melting point of 158° C.

The product was soluble in alcohol, ether, acetone, benzene, chloroform, isopropyl ether and aqueous acetone, insoluble in water. Dilute aqueous acids decomposed it.

*Analysis.*—$C_{27}H_{42}O_5$; molecular weight=446.61. Calculated: C, 72.61%; H, 9.48%. Found: C, 72.6%; H, 9.4%.

This compound is not described in the literature.

STEP E.—PREPARATION OF 3α-ACETOXY-20-HYDROXY-METHYL-5β-PREGNANE-21-OL-11-ONE (I)

0.4 g. of the acetonide of 3α-acetoxy-20-hydroxymethyl-5β-pregnane-21-ol-11-one (VI) were placed in suspension in a mixture of 4 cc. of 90% ethanol and 15 cc. of 6 N-hydrochloric acid and the mixture was agitated for a period of 2 hours. The reaction mixture was diluted with water. The crystalline precipitate formed was vacuum filtered, washed with water and dried. 0.330 g. of 3α-acetoxy-20-hydroxymethyl-5β-pregnane-21-ol-11-one (I) were obtained which by precipitation from isopropyl ether gave a pure product whose melting point was 158° C. and whose specific rotation was $$[\alpha]_D^{20} = +67° \text{ (c.=0.5\% in acetone)}$$

Various modifications of the process of the invention may be made without departing from the spirit or scope thereof, and it is to be understood that the invention is to be limited only as defined in the appended claims.

We claim:

1. A process for the preparation of 20-hydroxylmethyl-5β-pregnanes having the formula

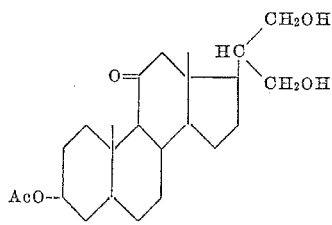

wherein Ac is an acyl radical of an aliphatic carboxylic acid having 2 to 7 carbon atoms which comprises reducing the di-lower alkyl ester of 20-carboxy-5β-pregnane-3α-ol-11-one-21-oic acid with a mixed hydride to form 20-hydroxymethyl-5β-pregnane-3α,11β,21-triol, reacting the latter with a lower aliphatic ketone in the presence of perchloric acid to form the corresponding ketonide of 20-hydroxymethyl-5β-pregnane-3α,11β,21-triol, esterifying the latter with an esterifying agent to form a lower aliphatic ketonide of 3α-acyloxy-20-hydroxymethyl-5β-pregnane-11β,21-diol wherein the acyl radical is derived from an aliphatic carboxylic acid having 2 to 7 carbon atoms, oxidizing the latter with a sulfuric acid-chromic acid oxidizing agent to form a lower aliphatic ketonide of 3α-acyloxy-20-hydroxymethyl-5β-pregnane-21-ol-11-one where acyl has the above meaning; hydrolyzing the latter under acidic conditions to form 3α-acyloxy-20-hydroxymethyl-5β-pregnane-21-ol-11-one where acyl has the above meaning and recovering the latter.

2. The process of claim 1 wherein the reduction is effected in tetrahydrofuran.

3. The process of claim 1 wherein the esterification is effected with the desired acid anhydride in the presence of pyridine.

4. The process of claim 1 wherein the hydrolysis is effected in ethanol in the presence of hydrochloric acid.

5. A process for the preparation of 3α-acetoxy-20-hydroxymethyl-5β-pregnane-21-ol-11-one which comprises reducing the dimethyl ester of 20-carboxy-5β-pregnane-3α-ol-11-one-21-oic acid in tetrahydrofuran with lithium aluminum hydride to form 20-hydroxymethyl-5β-pregnane-3α,11β,21-triol, reacting the latter with acetone in the presence of perchloric acid to form the acetonide of 20-hydroxymethyl-5β-pregnane-3α,11β,21-triol, reacting the latter with acetic anhydride in pyridine to form the acetonide of 3α-acetoxy-20-hydroxymethyl-5β-pregnane-11β,21-diol, oxidizing the latter with chromic acid in the presence of acetone and sulfuric acid to form the acetonide of 3α-acetoxy-20-hydroxymethyl-5β-pregnane-21-ol-11-one, hydrolyzing the latter in ethanol in the presence of hydrochloric acid to form 3α-acetoxy-20-hydroxymethyl-5β-pregnane-21-ol-11-one and recovering the latter.

6. 20-hydroxymethyl-5β-pregnane-3α,11β,21-triol.

7. The acetonide of 20-hydroxymethyl-5β-pregnane-3α,11β,21-triol.

8. The acetonide of 3α-acetoxy-20-hydroxymethyl-5β-pregnane-11β,21-diol.

9. The acetonide of 3α-acetoxy-20-hydroxymethyl-5β-pregnane-21-ol-11-one.

No references cited.